(No Model.)

W. PEAK.
SAW.

No. 298,886. Patented May 20, 1884.

WITNESSES:
Donn Twitchell
C. Sedgwick

INVENTOR:
W. Peak
BY Munn & Co
ATTORNEYS.

UNITED STATES PATENT OFFICE.

WALTER PEAK, OF PEAKVILLE, NEW YORK.

SAW.

SPECIFICATION forming part of Letters Patent No. 298,886, dated May 20, 1884.

Application filed April 2, 1884. (No model.)

*To all whom it may concern:*

Be it known that I, WALTER PEAK, of Peakville, county of Delaware, and State of New York, have invented a new and useful Improvement in Saw-Teeth, of which the following is a full, clear, and exact description.

In sawing logs or timber crosswise of the grain, saws are commonly used having teeth of an approximately-inverted V shape, the points of each alternate tooth being filed obliquely in reverse directions and bent or swaged outwardly, to give clearance to the body of the saw.

The object of this invention is to avoid the bending or setting of the body of the teeth, and to provide a saw which will cut freely, fast, and easily, and at the same time clear itself better than the common types of saws.

To these ends my invention consists in providing an ordinary saw-blade with a tooth vertical upon its forward edge to the line of the teeth, and having its cutting-edge formed by inclining the back of the tooth from the vertical edge at an angle of forty-five degrees, more or less.

My invention further consists in forming a V-shaped groove in the forward edge of the tooth, and in swaging the ends thus formed outwardly, to complete the cutting-points of the tooth, as will be hereinafter more particularly set forth.

Reference is to be had to the accompanying drawings, forming a part of this specification, in which similar letters of reference indicate corresponding parts in all the figures.

Figure 1:
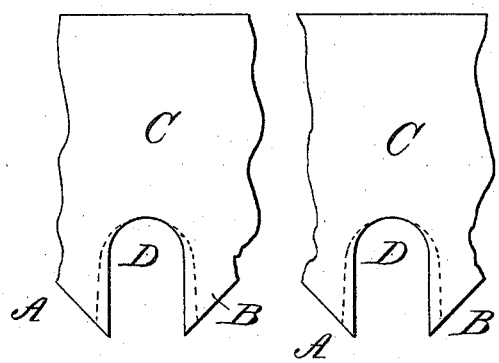
Figure 2:
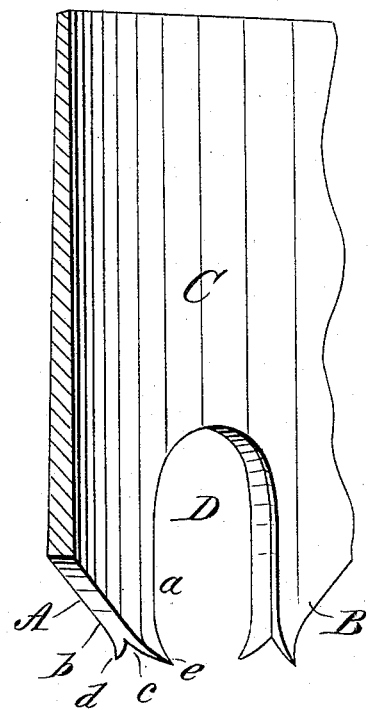
Figure 3:
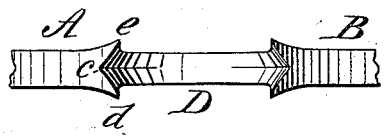

Figure 1 shows parts of an ordinary cross-cut saw provided with my improved saw-teeth. Fig. 2 is a part of the same on a larger scale. Fig. 3 is a plan view of the same.

I have shown my invention as applied to a cross-cut timber-saw; but it will be understood that it is applicable to any form of cross-cut saw.

In the drawings, A and B represent two similar but reversely-arranged saw-teeth, with a recess, D, between them, forming a bench in a cross-cut timber-saw, C; but, as with the exception of the reverse arrangement, the two teeth are the same in general form.

I will confine my description to the tooth A, of which a series can be arranged upon any saw-blade, straight or circular; or they can be arranged as shown, or combined with any desired form of planer-tooth. The forward edge, *a*, of the tooth is made about vertical to the horizontal axis of the saw-blade, or on a radial line, if for a circular saw. The back *b* of the tooth is made at an angle of forty-five degrees, more or less, with the forward edge, *a*. In the edge *a* is formed a groove, *c*, preferably V-shaped, extending to the base of the tooth. The back *b* of the tooth is filed to bring the ends *d* and *e* to a sharp point, and then, with a suitable swage, the said points are turned outwardly, as shown. This tooth cuts both ends of the kernel at once, and will take it out of the kerf, whereby planer or drag teeth are not required, and whereby also double the number of cutting-points can be formed upon the saw in the same space. It is much easier than other styles of saws to keep in order, as to sharpen it all that is needful is to file across the beveled edge *b* to bring the teeth to a sharp point, and then swage the said points outward.

This form of tooth can be used for inserted teeth as well as cut in the blade, as shown.

I do not limit myself to a V-shaped groove, as the same may be made in any form which will produce the points *d* and *e*.

Having thus described my invention, I claim as new and desire to secure by Letters Patent—

1. A saw-tooth substantially vertical upon its forward edge, having its back edge inclined at an angle of forty-five degrees, more or less, to the forward edge, having a groove formed in the said forward edge, and having the points formed by the back edge of the tooth and the V groove reversely swaged outwardly, substantially as shown and described.

2. A saw-tooth made integral with a saw-blade, having a groove formed in its forward edge, and two cutting-points swaged outwardly and oblique to each other and to the plane of the saw-blade, both points being in the same plane at right angles to the plane of the saw-blade, substantially as shown and described.

WALTER PEAK.

Witnesses:
RANSOM R. HAWK,
HENRY STAIB.